United States Patent [19]

Coyne, Jr.

[11] Patent Number: 4,880,459
[45] Date of Patent: Nov. 14, 1989

[54] METHOD OF AND APPARATUS FOR REDUCING IRON OXIDE TO METALLIC IRON

[75] Inventor: Thomas J. Coyne, Jr., Clover, S.C.

[73] Assignee: T.C., Inc., Clover, S.C.

[21] Appl. No.: 211,817

[22] Filed: Jun. 27, 1988

[51] Int. Cl.$^4$ .............................................. C21B 13/02
[52] U.S. Cl. ......................................... 75/35; 266/80; 266/155
[58] Field of Search ...................... 266/80, 155; 75/35

[56] References Cited

U.S. PATENT DOCUMENTS

| | | | |
|---|---|---|---|
| 3,189,438 | 6/1965 | von Bogdandy | 75/35 |
| 4,019,724 | 4/1977 | Cruse, Jr. | 75/35 |
| 4,370,162 | 1/1983 | Dominguez-Ahedo et al. | 75/35 |

Primary Examiner—Melvyn J. Andrews

[57] ABSTRACT

This invention relates to a method and apparatus for reducing iron oxide to metallic iron, utilizing a continuous process employing a reducing gas with high hydrogen and carbon monoxide content made by a catalytically reforming mixture of hydrocarbons, reacted off-gases from the reduction process and steam generated from waste heat from the process and or flue gases. Carbon dioxide and water vapor present in the reacted off-gas is utilized as a hydrocarbon reforming oxidant. Steam generated from waste heat from process and/or waste flue gas is also used as a hydrocarbon reforming oxidant. The steam injected into the process gas stream is also used to control the hydrogen-carbon monoxide ratio required for efficient reduction of iron oxide to metallic iron. After catalytic reforming, the hydrogen to carbon monoxide ratio of the reformed reducing gas is monitored, and a signal is generated by the monitoring means, which controls the addition of steam to the heated reducing gas prior to its entering the reformer.

10 Claims, 2 Drawing Sheets

METHOD OF AND APPARATUS FOR REDUCING IRON OXIDE TO METALLIC IRON

BACKGROUND OF THE INVENTION

This invention relates to the field of direct reduction of iron oxide materials to produce metallic iron in a solid state, often refered to as direct reduced iron, or DRI. Many processes have, in recent years, utilized solid carbonaceous materials, fuel oils, natural gases and coal gases as a source of reductant for direct reduction. Batch processes, continuous processes and semicontinuous processes with cyclic process conditions, have all been considered to be state of the art commercialized processes, treating iron oxide in the form of pellets, natural lump ores, and fines, through means of shaft furnaces, kilns, rotary kilns, fluidized bed furnaces, and batch kilns.

Although great amounts of time, effort and money have been spent on these developments and some installations have been commercially operated, all the units have failed to meet commercially acceptable operation without difficulty, have had inherent design difficulties, have not had sufficient flexibility to use varying qualities of fuel, have not been accepted in industrial oriented societies, and have undergone major technological change due to inefficiencies and design. These processes also have not had the flexibility of utilizing low cost iron oxide raw material sources available from local sources in any form, therefore have not been commercially acceptable in some areas.

In recent years, as the quality requirements and specifications on finished iron and steel products have become of paramount importance, the need by the iron and steel industry for an economic source of high quality melting iron, which is sufficiently flexible to utilize various sources of and qualities of both iron oxide and fuels has become increasingly important for the survival of the industry. Tramp elements are present in most recycled materials and the availability of high quality melting stock is diminishing. Thus, a highly efficient and flexible direct reduction process is highly desirable. Direct reduced iron in the form of pellets, lump ore or agglomerated fines are generally free of undesired tramp elements as during the process of reduction the oxygen in iron oxide is removed without affecting the oxygen-bearing tramp elements in its solid state and is ideal for melting in electric arc vessels, oxygen blowing vessels, blast furnaces, and foundries for the iron and steel industry. The inhibiting factor to utilizing such direct reduced iron on a commercial scale has been principally the economics of producing direct reduced iron with a high degree of efficiency, inherent design deficiencies in commercially available processes, and the lack of flexibility in use of available iron and fuel sources.

The present invention is a direct reduction process in which reducing gas, controlled in quality content of reducing agent and hydrogen to carbon monoxide ratios, is produced by a continuous catalytic reforming gaseous hydrocarbon, gaseous in the natural state or vaporizable gases, to produce a controlled ratio of hydrogen and carbon monoxide and in which the oxidant utilized for hydrocarbon reforming is carbon dioxide and water vapor formed in the reduction process and steam generated from waste process and/or waste flue gases, resulting in optimum thermal efficiency of the process, optimum utilization of equipment, flexibility in use of varying sources of fuel and flexibility of raw material sources, and capable of utilizing a variety of types of reduction furnace units.

At the present time, a direct reduction process used commercially in some areas of the world where hydrocarbon fuels are available at low cost requires a ratio control of hydrogen and carbon monoxide at the discharge of the catalytic reformer and prior to injection into the reduction furnace. The present method of controlling the ratio is to saturate the process recycled gas with recycled hot water through a gas scrubber, resulting in contact of contaminated water consisting of acids, sulphur compounds and solids to downstream equipment, having a deleterious effect on that equipment. Additionally, the saturation of the recycled process gases at the required ratio of hydrogen and carbon monoxide decrease the efficiency of the process gas handling equipment.

As waste flue gases are ejected from the catalytic reformer in excess energy, the concept of the present invention is to recover the waste heat having the following effects on or capabilities of the process:

1. Generation of steam for hydrogen and carbon monoxide ratio control of the reducing gas.
2. Generation of steam for other in-plant uses.
3. Generation of steam for export and/or generation of power for process equipment.
4. Reducing the use of process gas scrubbers as a means of process gas carryover of contaminants.
5. Reducing contaminant carryover into the process gas stream and the deleterious effects on equipment, such as: acids, chlorides, sulphur, and solids.
6. Allowing the operation of the water system to be utilized as a means of cooling and cleaning the process gases.
7. Allowing the flexibility of varying qualities of hydrocarbon fuels used for the varying injection of steam in quantities to reduce deleterious effects from liquid hydrocarbons.
8. Increasing efficiencies of process gas handing compressors by reduction of water vapor throughput.
9. Increasing the availability of compressor use, allowing use of various types of compressors to be used in the process gas handling system.
10. Reducing maintenance and replacement cost of process gas handling equipment from corrosion or erosion.
11. Increasing productivity throughput in process gas availability with the reduction of water vapor requirements.
12. With the recovery of excess heat from exhausted flue gases, increasing the efficiency of flue gas discharge mechanisms, hot fans and/or stacks.
13. Reducing the deleterious effect of contaminants on the longevity of the heat recovery equipment and reformer catalytic reformer tubes and catalyst by the cleaning of the process water used in the scrubber, thereby increasing the safety of equipment operation.
14. Increasing the efficiency of the waste flue gas ejection system by the recovery of excess heat and cooling of the flue gas.
15. Lowering the power requirement of process gas equipment and waste flue gas handling equipment by the generation of steam in exiting flue gas system, and reducing of required water carryover.
16. Enabling the process gas system, reformer system, flue gas system, and reducing gas system to be computer controlled through the separation of the petrochemical area of the process from the metallurgical area of the plant, due to the elimination of water vapor input to the process gas stream which, presently is the basis of control of at least one existing process.

17. Increasing productivity by means of injection of steam, which is readily available and therefore eliminating the startup time to heat water from recycled water streams.

18. Increasing efficiency of present state of the art heat recovery equipment by the reduction of water vapor from the process gas stream.

19. Reducing the quality requirements of steel alloys, therefore lowering the operating and maintenance costs, by the reduction of contaminated materials carryover into the process stream.

One commercially operating direct reduction process requires a ratio control of hydrogen and carbon monoxide at the discharge of the catalytic reformer and prior to injection of gas into the direct reduction furnace of which presently available technology and patents require and stipulate that the method of hydrogen and carbon monoxide ratio control is generated by recycling hot water generated by the process through a process gas scrubber by the saturation of the process gas. Present operation of the prior art process results in water vapor carryover to the downstream gas handling apparatus. This carryover also contains contaminants, such as acids, chlorides, and solids, all having deleterious effects on downstream equipment from wear, corrosion, or erosion, resulting in early failure of equipment, unsafe operation of equipment, and high replacement and maintenance costs.

Present operation of the prior art process also shows process gas handling and flow apparatus, such as compressors, piping, valves, and heat exchangers, to have reduced efficiencies due to the carryover of water. There is also evidence that the water carryover causes flashing in heat exchangers, resulting in unsafe longevity of equipment. There is also evidence that the contaminants and particulates, such as dust, sludge, acidic compounds, chlorides, sulphur compounds, and the like, have deleterious effects on and cause damage to piping systems, compressors, valving, steels and alloys, and catalyst performance, the end result being decreases in performance in machinery, structural integrity of component parts and decreases in efficiency of heat transfer equipment and reforming.

Evidence also appears that slow startup times are required in prior art processes due to the requirement of hot water for the start of operation.

It is believed that the method of hydrogen and carbon monoxide ratio control through the prior art methodology is not exact and is subject to varying degrees with inclement weather, night and day operation, since the method of water temperature control is maintained through a recycled water system.

It is of paramount importance for hydrogen and carbon monoxide ratio to be closely controlled to achieve maximum efficiency in reduction of iron oxides, and therefore full potential of production.

It is also believed that reduction kinetics must be maintained for the raw material iron oxides through the means of exacting hydrogen and carbon monoxide ratio control, otherwise resulting in inefficiencies of operation, furnace clustering of materials, furnace upsets and minimized operations, all of which are evidenced by present operations.

It is also contended that the efficient use of waste energy in the for of exiting flue gas by means of steam generation, recovery of the heat exhausted, allows corrective measures to be taken as claimed, increasing the productivity and efficiency of the overall process.

It is also contended that the present state of the art direct reduction processes commercially utilized are not designed for flexibility in hydrocarbon fuels available and raw material sources available in that they are designed for specific fuel feeds and raw material sources.

The present invention allows for and makes available technology adaptations and implements for the increased efficiency of direct reduction plants and new designs for a direct reduction process for flexibility in both raw materials and fuel sources. While it makes available conversions of existing direct reduction plants for increased capability, production, efficiencies and safer operation with reduced costs.

OBJECTS OF THE INVENTION

It is the primary object of this invention, therefore, to provide an improved process for converting iron oxide to metallic iron having the flexibility of raw material and fuel sources.

It is another objective to provide an economical direct reduction process and method of reducing iron oxide to metallic iron.

It is another objective of this invention to segregate the reduction furnace from the process gas handling, treatment and catalytic reforming for the efficient control of the production of reducing gases.

It is another objective of this invention to recover waste heat exhausted from flue gases for the generation of steam so utilized in the control of required hydrogen and carbon monoxide ratios and injected in the process gas stream. Said excess steam also to be utilized for the generation of power for process equipment or export as energy or utilized in other plant requirements.

It is another objective of this invention to provide steam as a source of reforming oxidant to reduce the deleterious effect of recycling water vapor from process gases formed in the reduction process containing compounds of acids and solids on equipment, reducing, therefore, the safety and longevity of equipment, as can be seen in commercial processes presently.

It is a further objective of this invention to have the flexibility of control through controlled steam injection into the process gas stream for the required control of hydrogen and carbon monoxide ration for the iron oxide raw materials available, which is not now available in commercial processes.

It is another and further objective of this invention to provide for continuous catalytic reforming of a gaseous hydrocarbon utilizing carbon monoxide, water vapor and steam as the principle reforming oxidants in a manner that protects the reforming catalyst from destruction by carbon deposition from hydrocarbons.

It is another objective of this invention to make available more highly efficient technology for the conversion of existing direct reduction plants for the purpose of increased efficiency, increased productivity, increased flexibility, reduction of inherent design deficiencies, more efficient use of equipment and safer operation of equipment, with increased control of catalytic reforming, increased control for reduction of iron oxides, increased control of recycle water systems and increased control of gas handling equipment.

It is a further objective of this invention in a plant conversion of existing direct reduction plants to reduce maintenance costs of equipment and increase efficiencies of the operating costs of equipment.

BRIEF DESCRIPTION OF THE DRAWINGS

The above features of this invention appear from a consideration of the following detailed description in conjunction with and with reference to the accompanying drawings, wherein.

DETAILED DESCRIPTION

Figure 1:
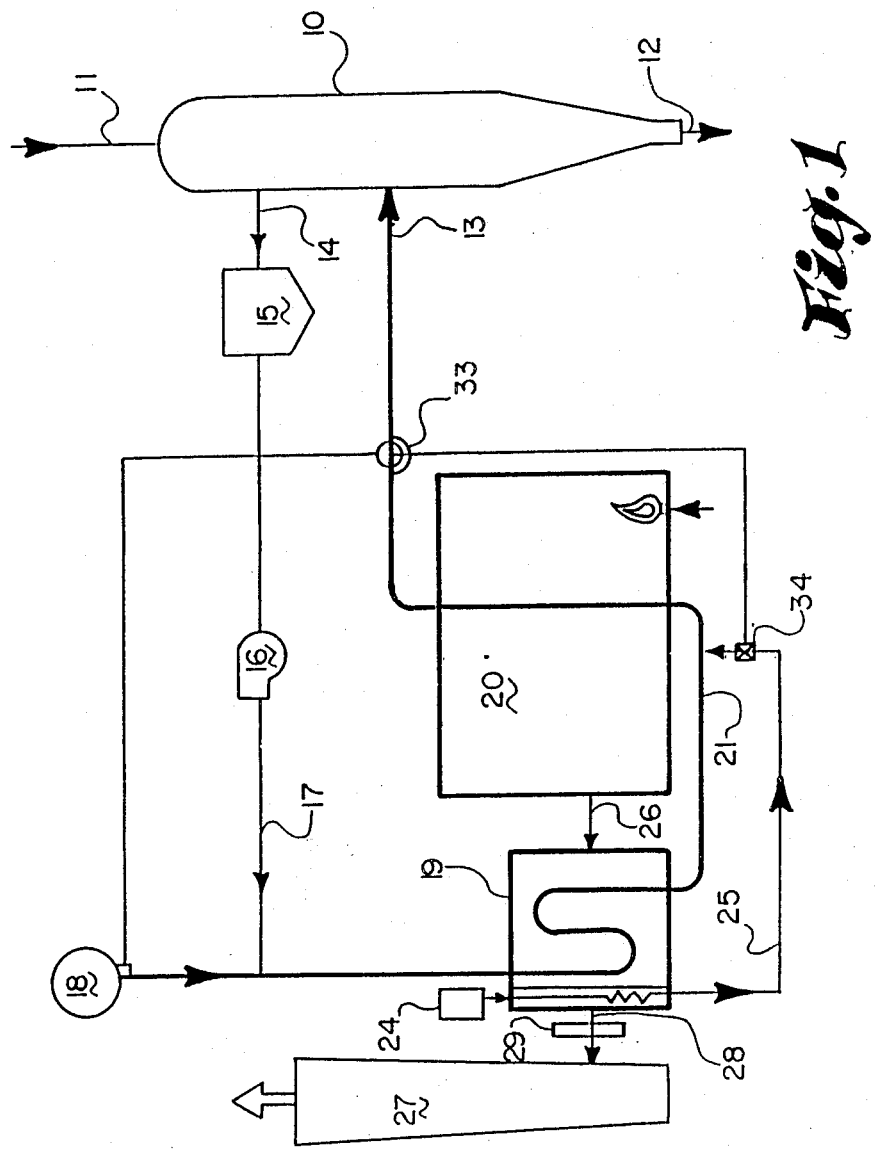
FIG. 1 is a schematic diagram of the invented process and the apparatus for its operation as well as the conversion of an existing prior art process.
Figure 2:
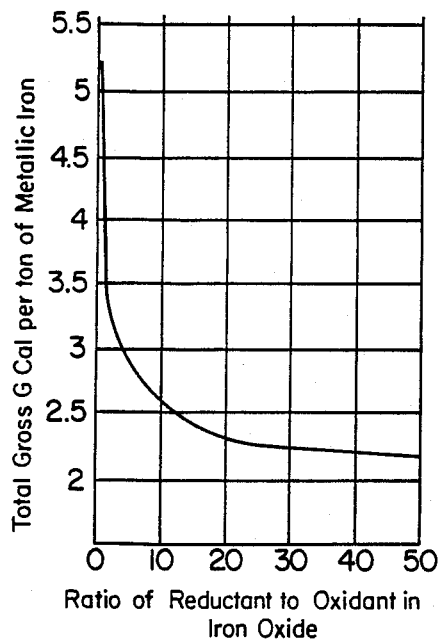
FIG. 2 is a graph showing required flexibility in reducing gas based on iron oxide raw materials.
Figure 3:
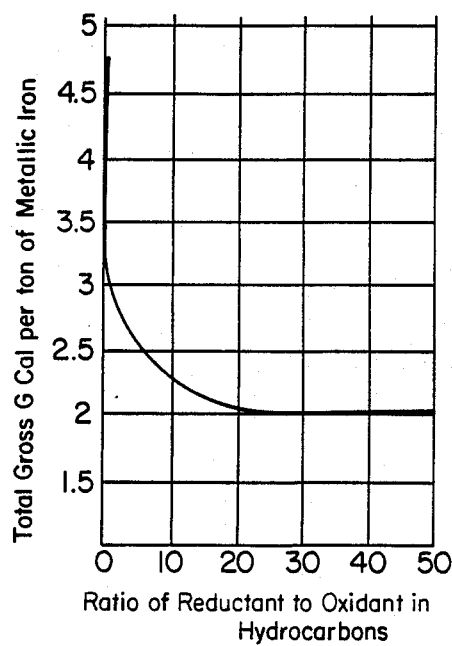
FIG. 3 is a graph showing required flexibility in utilization of varying hydrocarbon sources with varying qualities of hydrocarbons.

FIG. 1 shows the basic apparatus employed in the invented process, wherein a direct reduction furnace 10 has a burden feed system 11 at its top and a solids removal system 12 at its bottom. The reduction furnace has three generally distinct zones, an upper feed zone, a central reducing zone, and a lower discharge or cooling zone. A reducing gas inlet 13 generally defines the lower end of the reducing zone, whereas a spent top gas outlet 14 generally defines the top of the reducing zone. The spent top gas outlet 14 is connected to a scrubber cooler 15, the outlet of which is connected to a compressor 16. Scrubber 15 is advantageously a once-through scrubber, wherein the hot top gases are passed through spray water, which is then discharged from the scrubber along with the particulates and other undesirable components removed from the top gas by the cooler scrubber. The temperature of the water introduced to the scrubber should be no higher than ambient temperature and can be as cool as conveniently possible, unlike some prior art processes, which require the scrub water to be preheated. The compressed process gas from compressor 16 is combined with a gaseous hydrocarbon fuel from source 18 and the mixture is introduced to heat exchanger 19. The output of heat exchanger 19 is connected to reformer 20 through a pipe 21. The reformer is a catalytic reformer having catalyst-containing tubes within it. The output of reformer 20 is connected by pipe 22 to reduction gas inlet 13 of the direct reduction furnace. An external source of steam (water source 24) is connected by pipe 25 to pipe 21 to inject steam into pipe 21. Pipe 25 passes through the heat exchanger, to heat the water as it passes therethrough (as indicated by coils) to form steam.

The hot combustion gas exhausted from the reformer passes through pipe 26 to heat exchanger 19 and acts as the source of heat for the heat exchanger, which is connected to a power stack 27 through pipe 28. Alternatively, a hot fan 29 can be placed in pipe 28. The ratio controller 33 for controlling the hydrogen-carbon monoxide ratio of the reduction gas is located in the pipe 22 between the reformer and the reduction gas inlet. This ratio controller is connected to a valve 34 in the steam line for controlling the injection of steam into the heated hydrocarbon fuel-process gas mixture introduced to the reformer.

In operation, iron oxide in the form of pellets, lumps, or the like, is fed into the upper end of direct reduction furnace 10 through burden feed system 11. Reducing gas is introduced to the furnace through inlet 13, reacts with the oxide burden to form spent top gas containing principally carbon dioxide and $H_2O$, which is removed through spent top gas outlet 14 to scrubber cooler 15, wherein clean cool spray water passes through the spent top gas, and scrubs out the particulates while simultaneously cooling the hot gases. Scrubber 15 is advantageously a once-through scrubber, wherein the hot top gases are passed through spray water, which is then discharged from the scrubber along with the particulates and other undesirable components removed from the top gas by the cooler scrubber. The discharge or effluent scrub water can be cleaned for use elsewhere. The temperature of the water introduced to the scrubber should be no higher than ambient temperature and can be as cool as conveniently possible, unlike some prior art processes, which require the scrub water to be preheated. The cooled process gases are passed through compressor 16, then the compressed process gas from compressor 16 is combined with a gaseous hydrocarbon fuel, such as natural gas, from source 18 and the mixture is introduced to heat exchanger 19, which is heated by waste gas from the reformer. The heated gas output of heat exchanger 19 is passed through reformer 20, wherein it is reformed to carbon monoxide and hydrogen.

The output of reformer 20 is the reducing gas which is introduced to reduction gas inlet 13 of the direct reduction furnace. After the reducing gas has passed upwards through the burden and reduced the oxides in the furnace, metallic direct reduced iron product is removed from the furnace through solids removal system 12 at the furnace bottom in a conventional manner.

The ratio of hydrogen to carbon monoxide in the reduction gas is controlled by monitoring the ratio of components by monitor 33, which is a gas analyzer and control, which controls the amount of steam injected into the gas prior to reforming. The monitor 33 determines the ratio of hydrogen to carbon monoxide in the reformed reducing gas and generates a signal which opens a valve thereby adding steam to the heated reducing gas prior to reforming to adjust this ratio. It is also possible to control the amount of gaseous fuel from source 18 mixed with the recycled clean top gas by utilizing the same controller, as shown.

Hot gases from power stack 27 may be exhausted or collected for use elsewhere. Alternatively, a hot fan 29 can be provided in pipe 28 for exhausting hot gases.

What is claimed is:

1. A method for the direct reduction of iron oxide to metallic iron comprising: contacting iron oxide material in a furnace with a reducing gas consisting primarily of carbon monoxide and hydrogen; reacting the gas with the iron oxide to form substantially reduced metallic iron and a spent reducing gas consisting substantially of carbon monoxide, $H_2O$, and small quantities of unreacted reducing gas components; withdrawing the reacted gas from the furnace; cooling and cleaning the withdrawn reacted gas; mixing the cooled clean reacted gas with a gaseous hydrocarbon fuel; heating the gas mixture; reforming the gas mixture to a high percentage of reductants, carbon monoxide, and hydrogen; monitoring the hydrogen to carbon monoxide ratio of the reformed reducing gas and generating a signal thereby; adding steam to the heated reducing gas prior to reforming in response to said signal; and introducing the reformed reducing gas to the direct reduction shaft furnace.

2. A method according to claim 1, further comprising scrubbing removed top gas with only clean cooled scrubber water.

3. A method according to claim 1, further comprising adding additional hydrocarbon fuel to the process gas fuel gas mixture in response to said signal.

4. Apparatus for the direct reduction of metal oxide to reduced metallic product, comprising:
- a direct reduction shaft furnace having a burden feed inlet at its top and a solids removal outlet at its bottom, an upper feed zone, a central reducing zone, and a lower discharge zone within said furnace;
- a reducing gas inlet generally at the lower end of the reducing zone, and a spent top gas outlet generally at the top of the reducing zone;
- a scrubber cooler connected to the spent top gas outlet by a pipe, the outlet of which is connected to a compressor;
- a source of gaseous hydrocarbon fuel;
- means for combining compressed process gas from the compressor with said hydrocarbon fuel to form a gas mixture;
- a heat exchanger;
- means for introducing said gaseous mixture to said heat exchanger;
- a catalytic reformer having catalyst-containing tubes therein;
- a first gas pipe connecting said heat exchanger to the inlet of said reformer;
- a second gas pipe connecting the outlet of said reformer to the reduction gas inlet of the direct reduction furnace;
- a source of steam;
- means for injecting steam into said pipe connecting said heat exchanger and said reformer;
- means for monitoring and analyzing the ratio of reductants in the reducing gas produced by said reformer, and for generating a signal; and
- means responsive to said signal for controlling the amount of steam injected into said first pipe.

5. Apparatus according to claim 4, further comprising means for monitoring and analyzing the ratio of reductants in the reducing gas produced by said reformer, and for generating a signal.

6. Apparatus according to claim 4, wherein said source of steam is a source of water connected to said heat exchanger, whereby said water is heated to steam therein.

7. Apparatus according to claim 4 wherein said steam control means includes a valve in said steam pipe, which valve is responsive to said signal.

8. Apparatus according to claim 4, further comprising a power stack connected to the hot exhaust gas outlet of said heat exchanger.

9. Apparatus according to claim 4, further comprising a hot fan in an exhaust pipe of said heat exchanger.

10. Apparatus according to claim 4 further comprising means for controlling the introduction of hydrocarbon fuel from said fuel source responsive to a signal produced by said means for monitoring and analyzing the ratio of reductants in the reducing gas.

* * * * *